S. T. ALLEN & G. A. CLEAVELAND, Jr.
VALVE MECHANISM FOR INTERNAL COMBUSTION ENGINES.
APPLICATION FILED APR. 22, 1913.
1,104,466.
Patented July 21, 1914.
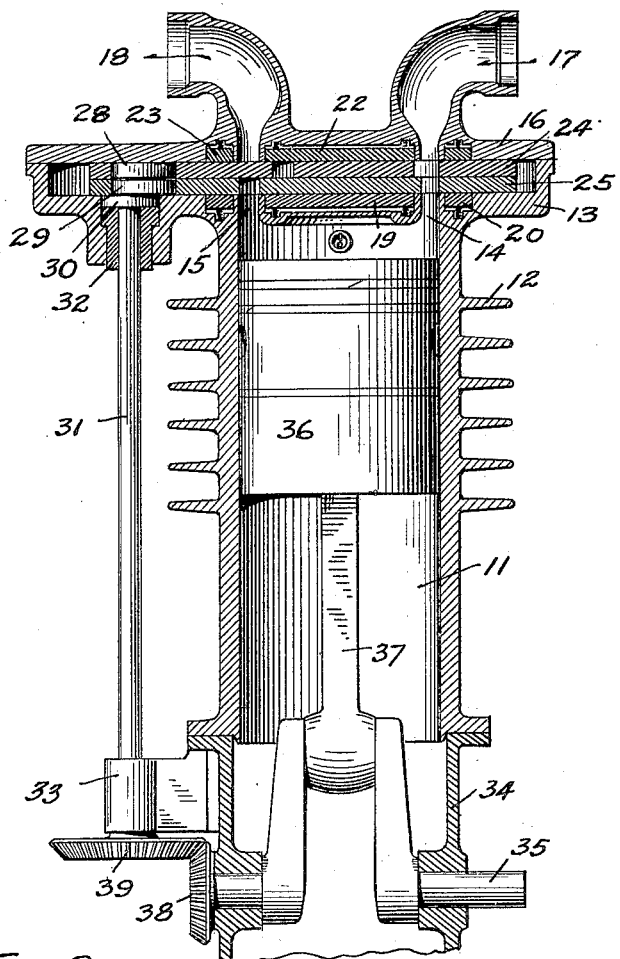
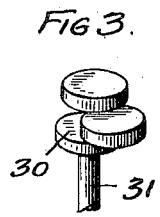
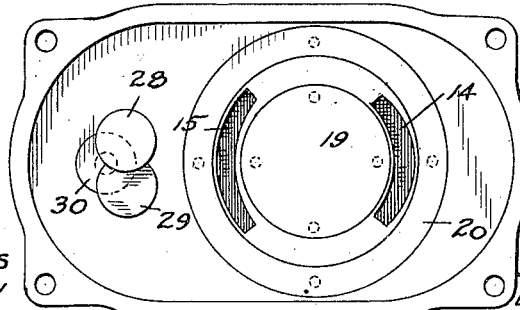
INVENTORS
SHERMAN T. ALLEN
GEORGE A. CLEAVELAND Jr.

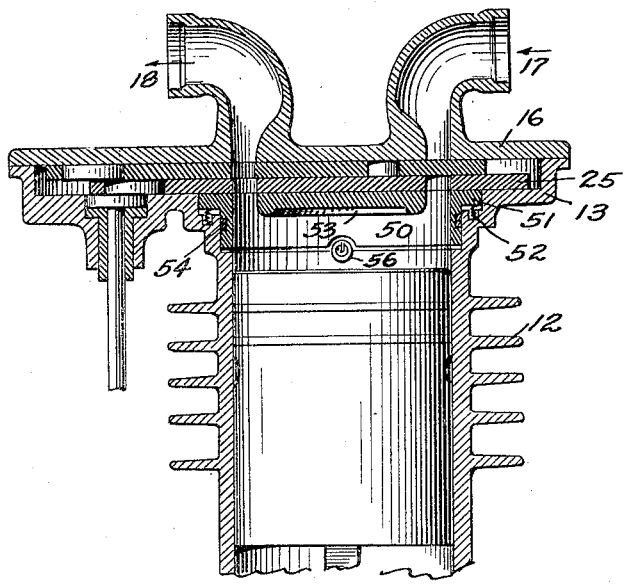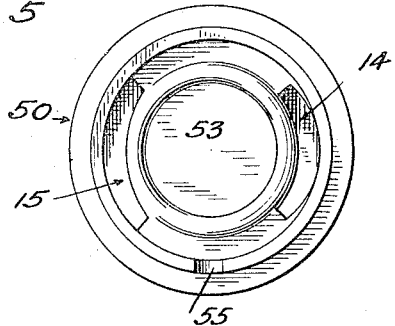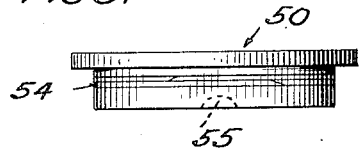

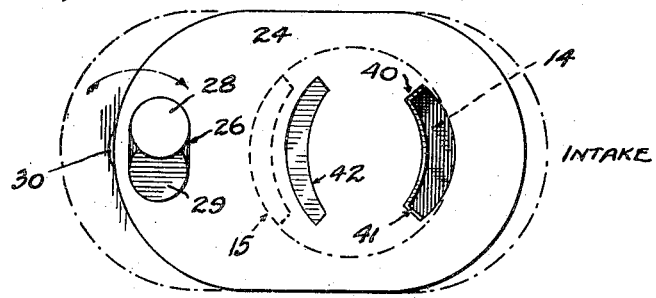
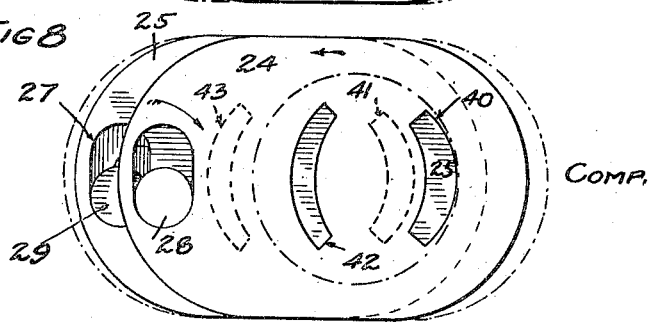
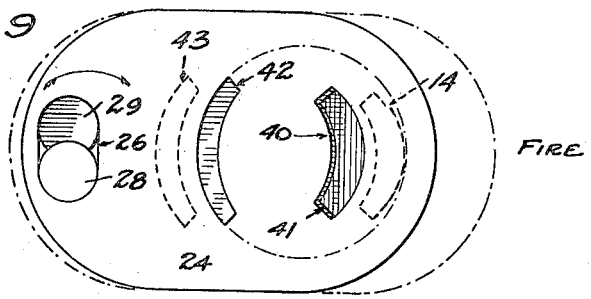
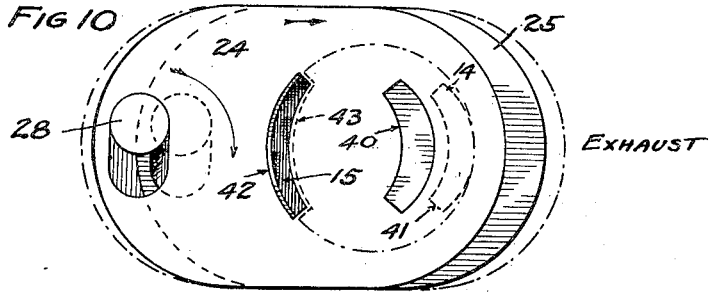

UNITED STATES PATENT OFFICE.

SHERMAN T. ALLEN, OF LOS ANGELES, AND GEORGE A. CLEAVELAND, JR., OF GLENDALE, CALIFORNIA.

VALVE MECHANISM FOR INTERNAL-COMBUSTION ENGINES.

1,104,466.  Specification of Letters Patent.  Patented July 21, 1914.

Application filed April 22, 1913. Serial No. 762,768.

*To all whom it may concern:*

Be it known that we, SHERMAN T. ALLEN, a citizen of the United States, residing at Los Angeles, in the county of Los Angeles and State of California, and GEORGE A. CLEAVELAND, Jr., residing at Glendale, in the county of Los Angeles and State of California, have invented a new and useful Improvement in Valve Mechanism for Internal-Combustion Engines, of which the following is a specification.

This invention relates to internal combustion engines, and particularly to the valve mechanism, and the principal object is to provide an engine of this type with sliding valves inclosed in a valve chest.

It is also an object to provide an internal combustion engine of the four stroke type, with sliding valves located at one end of the combustion chamber.

It is also an object to provide an internal combustion engine with sliding valves located at the upper portion of the explosion chamber with suitable packing means that efficiently prevent the escape of the compression or explosive effect of the charge.

It is a further object of this invention to provide an internal combustion engine with a plurality of sliding plates provided with suitable ports which may be actuated directly from the crank shaft to register said ports with the inlet and outlet ports of the engine at the proper intervals to perform the function required.

In the drawings accompanying this specification and forming therewith the application for Letters Patent: Figure 1 is a central vertical section of one cylinder of an internal combustion engine showing the invention applied thereto, the position of the valves being at the beginning of the intake or suction stroke. Fig. 2 is a plan view of the valve casing with the valve plates and cover removed. Fig. 3 is a detail perspective of the eccentric valve gear used to reciprocate the valve plates. Fig. 4 is a section similar to Fig. 1, showing a modified and preferred form of packing sleeve for the plates. Fig. 5 is a bottom view of the packing sleeve alone. Fig. 6 is a side elevation thereof. Fig. 7 is a plan view of the plates as shown in Fig. 1, the ports being registered at the intake position. Fig. 8 is a similar view of the plates in the compression position. Fig. 9 is a view of the valve plates in the firing position. Fig. 10 is a plan view of the plates in the exhaust position.

More specifically in the drawings, 11 designates the cylinder provided with the cooling flanges 12 and head 13 formed of the general elongated form shown, and provided with an inlet port 14 and an exhaust port 15, extending upwardly through the head, these ports opening into the recess formed in the head, within which the valve plates are seated. The covering plate 16 provided with an inlet pipe 17 and an exhaust pipe 18 form the closures for the valve chest, and the ports therein are of similar form as the ports 14 and 15, and are adapted to register and be in line therewith. Intermediate the ports in the head, is the packing disk 19, and surrounding the ports is the packing ring 20, pressure being applied to these in any well known manner, that shown being by means of springs 21 which are seated in suitable bores sunk into the groove and recess provided in the head to receive the disk and ring. A similar disk 22 is mounted in the valve chest cover 16 and placed intermediate of the ports therein. The cover being also supplied with a ring 23, each of which is similarly mounted and oppositely disposed to the ring and disk in the head.

A preferred and simpler form of packing is shown in Figs. 4— 5— and 6, in which a cylindrical member 50 is introduced into an angular recess cut in the cylinder walls adjacent the lower face of the valve chest; this member having a horizontally disposed flange 51 which extends into a continuation of the recess described and is resiliently supported therein by means of springs 52 which force the member acting as a single packing plate into contact with the lower face of the valve plate 25. To properly insure a tight fit within the cylinder walls, the member 50 is provided with packing rings 54, a plurality of these being shown superimposed upon one another, although other methods may be used. The central portion 53 of the member forms a head for the cylinder, the inlet ports 14 and exhaust port 15 being formed therein as described for the head shown in Fig. 1. This head, however, being slidably mounted and there being no escape of the charge through any circuitous passage, the faces being adapted to fit so closely as to practically eliminate friction and prevent the escape of the compressed gases. A notch 55 is preferably cut in the lower edge of the member to provide for the spark plug 56, the plates in Fig. 4 being shown in the exhaust position.

Slidably mounted within the casing or valve chest, and in engagement with the rings and disk, are the plates 24 and 25; plate 24 being superimposed upon the plate 25 and adapted to slide thereon; plate 25 having a sliding fit with the bottom of the recess forming the chest in the head of the cylinder. These plates are of similar form and thickness, and are each provided with transversely disposed slots designated 26 and 27, which respectively fit over and engage the eccentrically mounted circular disks 28 and 29, mounted and secured to the disk 30 on the upper end of the valve shaft 31. This valve shaft is mounted in suitable bearings 32 and 33, the first being formed in the head of the engine, and the latter secured to the base 34 to which the cylinder 11 is suitably secured.

Mounted within bearings on the base is the crank shaft 35 connected to the piston 36 slidably mounted within the cylinder 11 by means of the piston rod 37. One end of the crank shaft exterior the casing has keyed thereon the beveled gear 38, which is adapted to mesh with the gear 39 of twice the size or number of teeth keyed to the lower end of the valve shaft 31, so that for each two complete turns of the crank shaft, the valve shaft is turned once to reciprocate the valve plates in the four positions required for the four strokes of the piston.

These various positions of the valve plates are clearly illustrated in the last four figures of the drawing, it being assumed that the engine is being driven clockwise and the valve shaft turned in a corresponding direction. The upper plate having the inlet port 40 is shown registering with the inlet port 41 of the plate 25, the two circular disks engaging with these plates having their slots registering and the inlet ports 40 and 41 registering with the inlet port 14 in the head of the cylinder. In the further revolution of the valve shaft, one quarter of the turn is shown in Fig. 8, the plate 24 having remained practically stationary while the plate 25 has been reciprocated to the left by the shifting of its actuating disk 29, bringing the disks in longitudinal alinement, and the port 41 has been correspondingly moved the same distance to the left, so that the intake port is efficiently closed and compression may take place within the cylinder. At the same time the exhaust port 43 in the plate 25 is carried from a position registering with the exhaust port 15, the charge being thereby retained within the combustion chamber.

The further movement of the valve shaft to a half revolution again brings the disks in a transverse alinement with the slots registering, and the plates both shifting to the opposite limit of their stroke from that illustrated in Fig. 7, the ports 40 and 41 again coming in alinement but over the disk 19, so that there is no escape of the charge while the ignition is taking place within the cylinder.

The fourth position of the head of the valve shaft brings the actuating disks again into longitudinal alinement quickly shifting the plate 25 to bring its exhaust port 43 into alinement and registry with the exhaust port 14 of the cylinder. The exhaust port 42 in the plate 24 also registering in this position to provide for the exhaust on the return stroke of the piston 36, thus completing one complete function of a four stroke internal combustion engine.

Various modifications of the driving mechanism are possible, but that shown has been found to work efficiently and gives the correct and necessary quick slide to the valve plates within the chest to accommodate this type of engine, the disks being superimposed upon the head of the valve shaft and secured in any well known manner with their axes disposed at an angle of substantially 90°, and their peripheries intersecting at the axis of rotation of the valve shaft, the valve plates being preferably placed in a horizontal position.

The angular relation of the disks may be varied to suit various variations in the cut-off and speed required of the plates, but the angle mentioned has been found to give the most efficiency under all conditions of load.

What we claim is:

1. An internal combustion engine, comprising a cylinder having oppositely disposed ports formed in its head, a piston reciprocatingly mounted in said cylinder, a plurality of plates having ports disposed there-through adapted to slide on said head, said plates also having slots oppositely disposed from said ports, disks adapted to register in and slide in said slots, a valve shaft, said disks being eccentrically fixed in relation to said valve shaft, and means interposed between said piston and said valve shaft whereby said valve shaft is driven to reciprocate said plates to register the ports therein in fixed and definite relation.

2. An internal combustion engine, comprising a cylinder having a valve chest formed on one end thereof, and having a plurality of recesses adjacent the intersection of the cylindrical walls and floor of said valve chest, a slidably mounted member adapted to engage said recess and provided with a centrally disposed portion forming a closure for said cylinder, having a plurality of ports therein, a plurality of sliding plates mounted in said valve chest, means to reciprocate said valve plates, and resilient means to force said slidably mounted member in operative contact with the lower of said plates.

In witness that we claim the foregoing we have hereunto subscribed our names this 7th day of April, 1913.

SHERMAN T. ALLEN.
GEORGE A. CLEAVELAND, Jr.

Witnesses:
W. F. KEENE,
MARIE BATTEY.

Copies of this patent may be obtained for five cents each, by addressing the "Commissioner of Patents, Washington, D. C."